(12) United States Patent
Sanders et al.

(10) Patent No.: US 10,858,225 B2
(45) Date of Patent: Dec. 8, 2020

(54) WINCH LINE SPEED CONTROL FOR A TRACK-TYPE MACHINE HAVING AN ELECTRIC DRIVE POWERTRAIN

(71) Applicant: Caterpillar Inc., Deerfield, IL (US)

(72) Inventors: Evan Randall Sanders, Peoria, IL (US); Christopher Mark Brian, Dunlap, IL (US); Thomas Gregory Pusch, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 218 days.

(21) Appl. No.: 16/006,038

(22) Filed: Jun. 12, 2018

(65) Prior Publication Data

US 2019/0375617 A1    Dec. 12, 2019

(51) Int. Cl.
| | |
|---|---|
| *B66D 1/48* | (2006.01) |
| *B60L 1/00* | (2006.01) |
| *B60W 20/15* | (2016.01) |
| *B62D 55/08* | (2006.01) |
| *B66D 1/08* | (2006.01) |

(52) U.S. Cl.
CPC .............. *B66D 1/485* (2013.01); *B60L 1/00* (2013.01); *B60W 20/15* (2016.01); *B62D 55/08* (2013.01); *B66D 1/08* (2013.01); *B60L 2200/40* (2013.01); *B60W 2300/17* (2013.01)

(58) Field of Classification Search
CPC .. B66D 1/485; B66D 1/08; B66D 1/44; B60L 1/00; B60L 2200/40; B60L 1/003; B60L 50/61; B62D 55/08; B62D 55/06; B62D 55/065; B60W 20/15; B60W 2300/17; B60W 2710/0644; B60W 2710/30; B60W 10/06; B60W 10/30; B60W 2300/44; Y02T 10/6217; B60K 6/46
See application file for complete search history.

(56) References Cited

U.S. PATENT DOCUMENTS

| | | | |
|---|---|---|---|
| 6,276,449 B1 | 8/2001 | Newman | |
| 2005/0072965 A1* | 4/2005 | Sanders | B66D 1/485 254/361 |
| 2012/0305321 A1* | 12/2012 | Wagger | B60G 11/56 180/9.52 |
| 2016/0060082 A1* | 3/2016 | Huang | B66D 1/08 700/213 |

* cited by examiner

*Primary Examiner* — Nga X Nguyen
(74) *Attorney, Agent, or Firm* — Miller, Matthias & Hull

(57) ABSTRACT

A track-type machine is disclosed. The track-type machine may comprise an electric drive powertrain including an internal combustion engine, a winch assembly having a drum rotatably supporting a cable so that the cable is reeled in or reeled out at a winch line speed when the drum is rotating, and an implement controller configured to activate the winch assembly for reeling in and reeling out the cable. The track-type machine may further comprise a hydraulic circuit driven by the internal combustion engine and configured to actuate a rotation of the drum when the winch assembly is activated by the implement controller. In addition, the track-type machine may further comprise a control system configured to increase an engine speed of the internal combustion engine when the winch assembly is activated by the implement controller.

20 Claims, 6 Drawing Sheets

WINCH LINE SPEED CONTROL FOR A TRACK-TYPE MACHINE HAVING AN ELECTRIC DRIVE POWERTRAIN

TECHNICAL FIELD

The present disclosure generally relates to track-type machines and, more specifically, to systems and methods for controlling winch line speeds in track-type machines having an electric drive powertrain.

BACKGROUND

Track-type machines, such as track-type tractors, may include a winch assembly for reeling in or reeling out a cable to raise or lower a load, recover another object, or self-recover itself when unable. The winch assembly may include a drum and the cable wound about the drum such that the cable is reeled in or reeled out at a winch line speed as the drum rotates in different directions. The drum may be rotatably coupled to and driven by a shaft that is hydraulically driven for rotation when hydraulic fluid flows through a hydraulic circuit, and the flow of the hydraulic fluid through the hydraulic circuit may be driven by the internal combustion engine of the machine. The flow of the hydraulic fluid through the hydraulic circuit in a first direction may drive the rotation of the drum in a first direction (to reel in the cable), and the flow of the hydraulic fluid through the hydraulic circuit in a second direction may drive the rotation of the drum in a second direction (to reel out the cable). An implement controller, such as a user-operated lever or joystick, may be used to activate the winch assembly for raising or lowering a load as needed. For instance, the implement controller may be displaced by the user in a first direction to reel in the cable, and it may be displaced in a second direction to reel out the cable.

The power systems of many track-type machines are becoming increasing electrified to provide advantages such as improved fuel economy and reduced emissions. For instance, track-type machines may have an electric drive powertrain that includes an internal combustion engine, an electric generator, and an electric motor. The electric generator may convert rotational energy from the internal combustion engine into electrical energy, and the electric motor may convert the electrical energy from the electric generator into rotational energy that is used to drive the movement of the tracks. Track-type machines equipped with an electric drive powertrain may operate at low engine speeds (eco-mode) in order to provide a favorable balance between fuel efficiency and machine emissions. However, because the winch assembly in such machines is driven by the internal combustion engine (via the hydraulic circuit), the low speed conditions of the engine may reduce the winch line speed and the performance of the winch assembly. As such, it may not be possible to achieve targeted winch line speeds in track-type machines equipped with an electric drive powertrain when the electric drive powertrain is operating in eco-mode.

Therefore, it is desirable to improve winch assembly performance in track-type machines having an electric drive powertrain. U.S. Pat. No. 6,276,449 discloses a mobile service rig having a hoist for raising and lowering a cable and hook, and a hydraulically-actuated tong that is used to torque two sucker rods. The engine speed is reduced in the service rig to lower hydraulic pressures when the tong is operating to prevent the tong from overtightening the connection. The patent does not, however, mention a strategy for controlling the line speed of the cable.

Thus, there is a need for improved methods and systems for controlling winch assemblies of track-type machines having an electric drive powertrain.

SUMMARY

In accordance with one aspect of the present disclosure, a track-type machine is disclosed. The track-type machine may include tracks, and an electric drive powertrain including an internal combustion engine configured to operate at an engine speed, an electric generator, and an electric motor. The track-type machine may further comprise a winch assembly including a drum rotatably supporting a cable so that the cable is reeled in or reeled out at a winch line speed when the drum is rotating. In addition, the track-type machine may comprise an implement controller configured to activate the winch assembly for reeling in or reeling out the cable, and a hydraulic circuit configured to actuate a rotation of the drum when the winch assembly is activated by the implement controller. A flow of hydraulic fluid through the hydraulic circuit may be driven by the internal combustion engine such that a flow rate of the hydraulic fluid through the hydraulic circuit increases as the engine speed increases, and a rate of rotation of the drum and the winch line speed may increase as the flow rate of the hydraulic fluid through the hydraulic circuit increases. The track-type machine may further comprise a control system configured to increase the engine speed of the internal combustion engine when the winch assembly is activated by the implement controller.

In accordance with another aspect of the present disclosure, a control system for controlling a winch line speed of a winch assembly of a track-type machine is disclosed. The track-type machine may include an electric drive powertrain having an engine operating at an engine speed, an implement controller configured to activate the winch assembly for reeling in and reeling out a cable of the winch assembly at the winch line speed, and a hydraulic circuit driven by the engine and configured to actuate the winch assembly when a hydraulic fluid flows therethrough. The control system may comprise a machine electronic control module (ECM) configured to receive a signal indicating that the winch assembly is activated by the implement controller, and to respond to the signal by transmitting a command to increase the engine speed. The control system may further comprise an engine electronic control module (ECM) configured to receive the command to increase the engine speed from the machine ECM, and to respond to the command by increasing the engine speed. The increase in the engine speed may provide an increase in a flow rate of the hydraulic fluid through the hydraulic circuit and an increase in the winch line speed.

In accordance with another aspect of the present disclosure, a method for controlling a winch line speed of a winch assembly of a track-type machine is disclosed. The winch assembly may include a drum rotatably supporting a cable. The track-type machine may have an electric drive powertrain including an internal combustion engine configured to operate at an engine speed. The method may comprise receiving a signal indicating that the winch assembly is activated, and increasing the engine speed in response to the signal indicating that the winch assembly is activated. The method may further comprise actuating a flow of hydraulic fluid through a hydraulic circuit in response to receipt of the signal that the winch assembly is activated. The flow of the hydraulic fluid through the hydraulic circuit may be driven by the internal combustion engine and may drive a rotation of the drum to reel in or reel out the cable at the winch line speed. A flow rate of the hydraulic fluid through the hydraulic circuit and the winch line speed may increase as the engine speed is increased.

These and other aspects and features of the present disclosure will be more readily understood when read in conjunction with the accompanying drawings.

DETAILED DESCRIPTION

Figure 2:
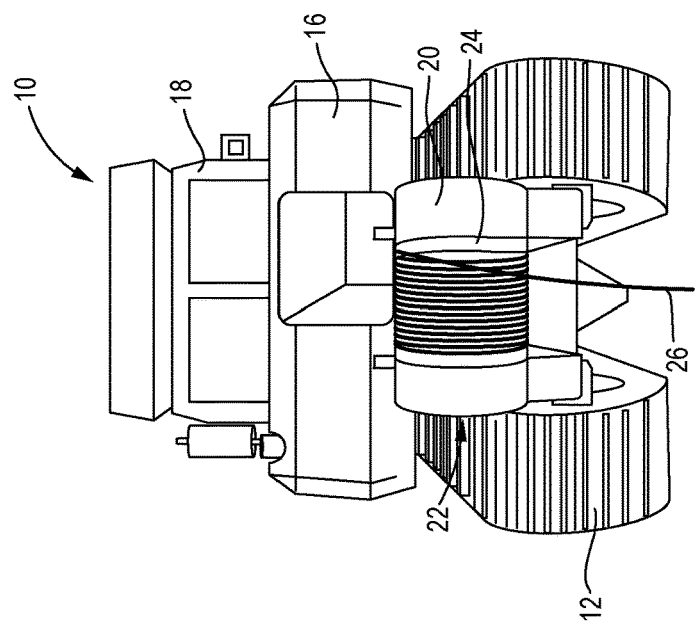
FIG. 2 is a rear view of the track-type machine of FIG. 1, constructed in accordance with the present disclosure.
Figure 1:
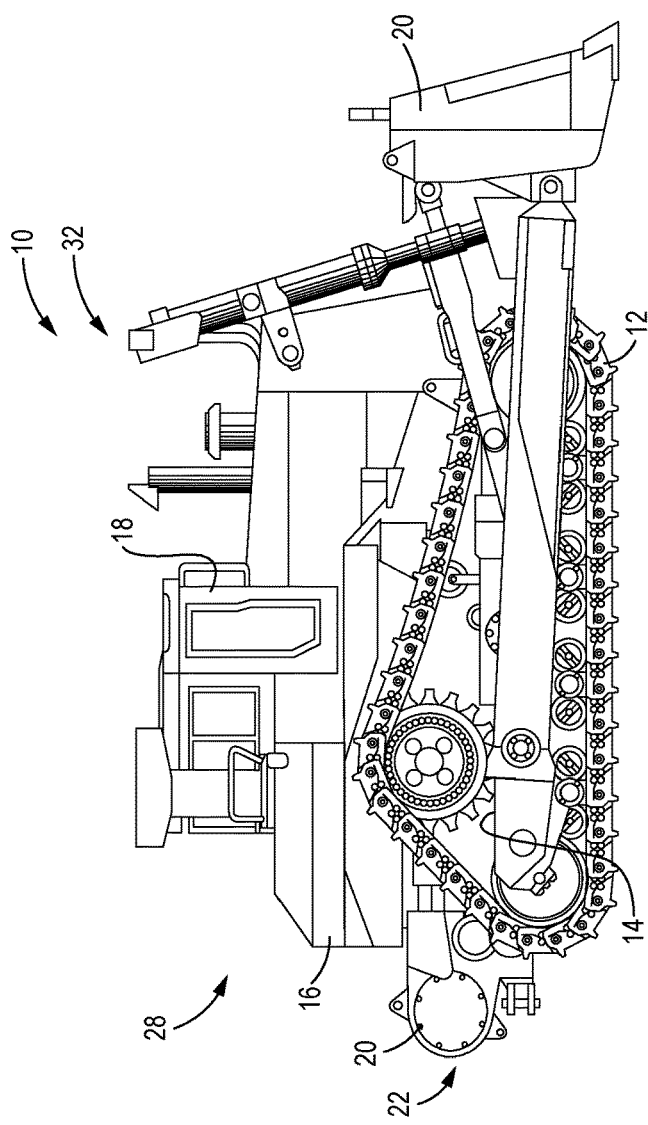
FIG. 1 is a side-view of a track-type machine having an electric drive powertrain and a winch assembly, constructed in accordance with the present disclosure.

Referring now to the drawings, and with specific reference to FIGS. 1-2, a track-type machine 10 is shown. The track-type machine 10 may include tracks 12, a chassis 14 coupled to the tracks 12 and supporting a machine body 16 which may include an operator cab 18, and one or more implements 20 configured to move a load. At least one of the implements 20 may be a winch assembly 22. The winch assembly 22 may include a drum 24 rotatably supporting a cable 26 so that the cable 26 may be reeled in or reeled out as the drum 24 rotates in different directions to raise or lower a load (see FIG. 2). The winch assembly 22 may be mounted on a rear side 28 of the machine 10 as shown, although it may be mounted at other positions of the machine 10 in alternative arrangements. Furthermore, the track-type machine 10 may include an electric drive powertrain 30 (see FIG. 3) to drive the rotation of the tracks 12 as well as the rotation of the drum 24 of the winch assembly 22, as explained in further detail below. The track-type machine 10 may be a tractor 32, a pipelayer, or various other types of track-type machines or vehicles that include a winch assembly and an electric drive powertrain.

Figure 3:
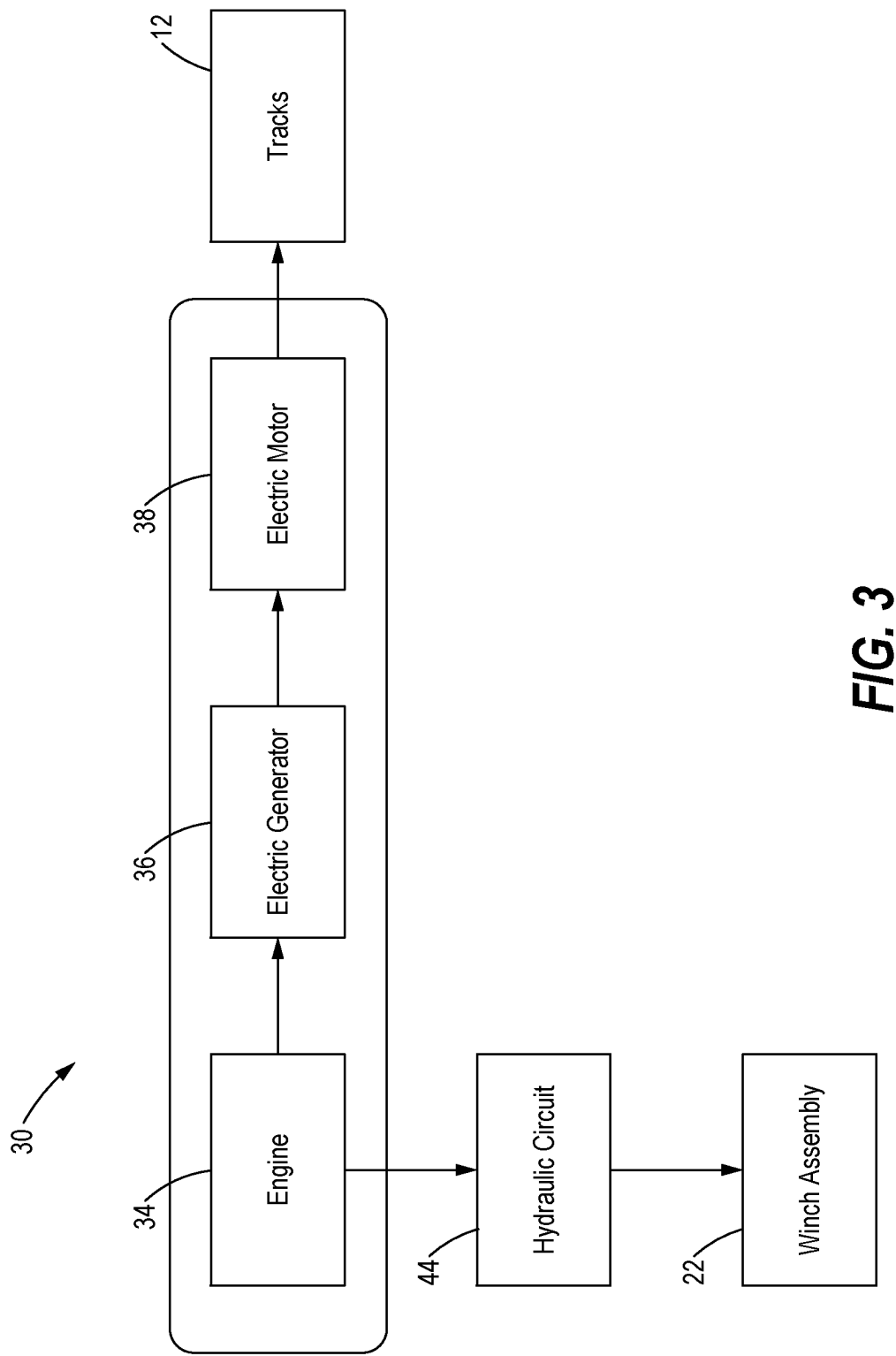
FIG. 3 is a flow diagram schematically illustrating the flow of power to the tracks and the winch assembly of the track-type machine, in accordance with the present disclosure.

Turning to FIG. 3, the electric drive powertrain 30 may include an internal combustion engine 34, an electric generator 36, and an electric motor 38. The internal combustion engine 34 may combust a fuel (e.g., diesel fuel, etc.) to generate rotational energy that is transmitted to the electric generator 36, and the electric generator 36 may convert the rotational energy from the engine 34 into electrical energy that is transmitted to the electric motor 38. The electric motor 38 may, in turn, convert the electrical energy from the electric generator 36 into rotational energy that is used to drive the rotation of the tracks 12 and the movement of the machine 10. Under normal operating conditions of the machine 10 (i.e., when the winch assembly 22 is inactive), the engine 34 may operate at a relatively low engine speed (eco-mode) to provide a desirable balance between fuel economy and low emissions. That is, when the winch assembly 22 is inactive, the engine speed may operate at a lower first speed which may be an established low speed or a range of low speeds. As used herein, the engine speed is the rate of rotation of a crankshaft 42 (see FIG. 4) that is driven by the engine 34.

Figure 4:
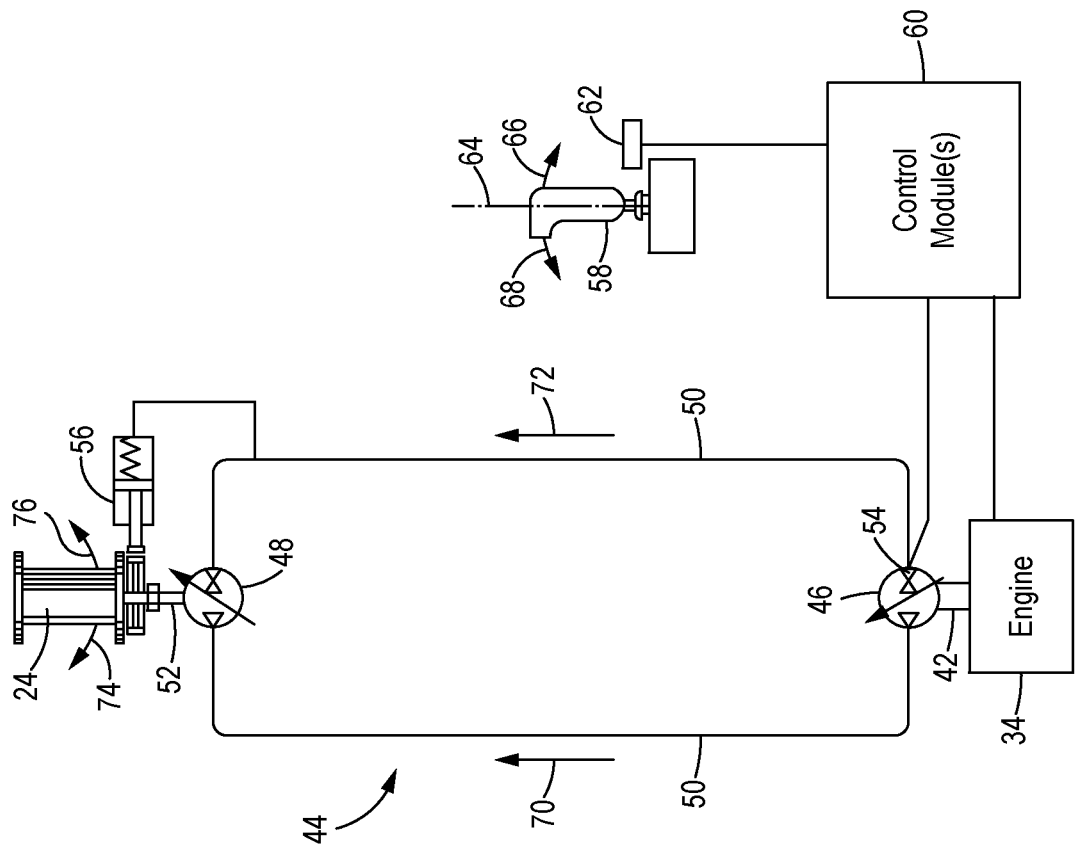
FIG. 4 is a schematic representation of certain elements involved in regulating the activity of the winch assembly, in accordance with the present disclosure.

Referring still to FIG. 3, the engine 34 may also provide power to drive a hydraulic circuit 44 that actuates the operation of the winch assembly 22. More specifically, as explained further below, the hydraulic circuit 44 may drive the rotation of the drum 24 for reeling in or reeling out the cable 26. As shown in FIG. 4, the hydraulic circuit 44 may include a hydraulic pump 46 that is driven by the rotation of the engine crankshaft 42, a hydraulic motor 48 that is driven by the hydraulic pump 46, and flow lines 50 to allow the flow of hydraulic fluid between hydraulic pump 46 and the hydraulic motor 48. The drum 24 of the winch assembly 22 may be rotationally coupled to a shaft 52 that is driven for rotation by the hydraulic motor 48, so that the drum 24 may rotate as the shaft 52 rotates when hydraulic fluid is flowing through the hydraulic circuit 44. The speed of the hydraulic pump 46 may increase as the engine speed increases, such that a flow rate of the hydraulic fluid through the hydraulic circuit 44 increases as the engine speed increases. Moreover, a rate of rotation of the drum 24 may be proportional to the flow rate of the hydraulic fluid through the hydraulic circuit 44, Consequently, the rate of rotation of the drum 24 (and the winch line speed) may increase as the engine speed increases. As used herein, the winch line speed is the speed at which the cable 26 of the winch assembly 22 is reeled in or reeled out from the machine 10.

As shown in FIG. 4, components involved in regulating the activity of the winch assembly 22 may include the hydraulic circuit 44, a valve 54 associated with the hydraulic pump 46, a brake 56 associated with the drum 24 and in fluid communication with the hydraulic circuit 44, the engine 34, an implement controller 58 such as a user-operated lever or joystick, and one or more control modules 60 in communication with the valve 54, the engine 34, and a position sensor 62 associated with the implement controller 58.

The implement controller 58 may be used to activate the operation of the winch assembly 22 for raising or lowering a load. The implement controller 58 may be in or near the operator cab 18 of the machine 10, or it may be a remotely located controller. When the implement controller 58 is in a default position 64, there may be little to no hydraulic fluid flowing through the hydraulic circuit 44, and the winch assembly 22 may be inactive (i.e., the drum 24 and the cable 26 may be stationary). More specifically, when the implement controller 58 is in the default position 64, the control module(s) 60 may receive a signal from the position sensor 62 indicating that the winch assembly 22 is inactive, and it may respond by closing the valve 54 or by maintaining the closure of the valve 54.

When the implement controller 58 is displaced in a first direction 66 or a second direction 68 from the default position 64, the flow of hydraulic fluid through the hydraulic circuit 44 may be initiated to activate the winch assembly 22 for rotating the drum 24 and reeling in or reeling out the cable 26. Specifically, the control module(s) 60 may receive a signal from the position sensor 62 indicating that the winch assembly 22 is activated, and it may open the valve 54 to permit the flow of the hydraulic fluid through the circuit 44. The flow of the hydraulic fluid through the circuit 44 may apply hydraulic pressure on the brake 56 to release the brake 56 on the drum 24, allowing the drum 24 to rotate. Displacement of the implement controller 58 in the first direction 66 may cause the hydraulic fluid to flow through the circuit 44 in a first direction 70 such that the shaft 52 and the drum 24 rotate in a first direction 74 (e.g., to reel in the cable 26). Likewise, displacement of the implement controller 58 in the second direction 68 may cause the hydraulic fluid to flow through the circuit 44 in a second direction 72 such that the shaft 52 and the drum 24 rotate in a second direction 76 (e.g., to reel out the cable 26).

Furthermore, as explained in further detail below, when the implement controller 58 is displaced in the first direction 66 or the second direction 68 to activate the winch assembly 22, the control module(s) 60 may increase the engine speed from the lower first speed to a higher second speed. The second speed may be an established engine speed or a range of engine speeds that is higher than the first speed and is sufficient to provide targeted winch line speeds. Increasing the engine speed from the first speed to the second speed may increase the flow rate of the hydraulic fluid through the hydraulic circuit 44 and, consequently, the rate of rotation of the drum 24 and the winch line speed. The winch line speed may be increased by about 10% to about 40% when the engine speed is at the second speed relative to when the engine speed is at the first speed. For example, the winch line speed may be increased by about 20% when the engine speed is at the second speed relative to when the engine speed is at the first speed. The increase of the engine speed when the winch assembly 22 is activated may improve the performance of the winch assembly 22 as it may allow the winch assembly 22 to reach targeted line speeds. This may not be possible with current winch assemblies of track-type machines having an electric drive powertrain which are designed to operate at low engine speeds. When the winch assembly 22 is inactivated (i.e., when the implement controller 58 reverts back to the default position 64), the control module(s) 60 may decrease the engine speed back to the lower first speed. Accordingly, the engine speed may be increased only while the winch assembly 22 is active.

Figure 5:
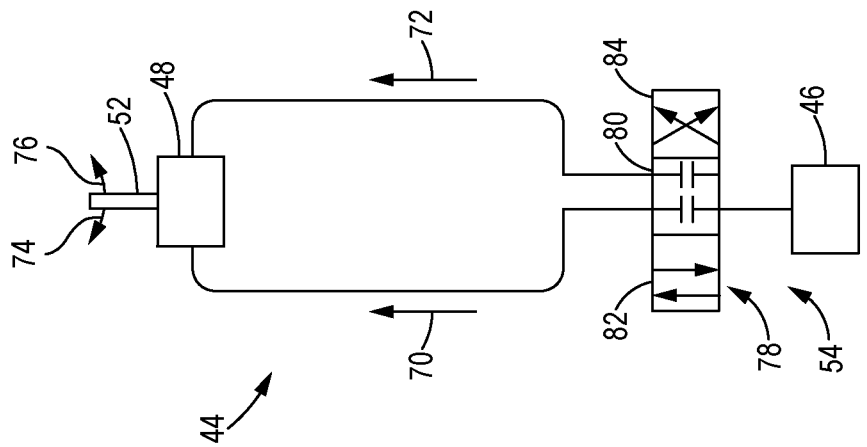
FIG. 5 is a schematic representation of a hydraulic circuit that actuates the operation of the winch assembly, in accordance with the present disclosure.

The valve 54 of the hydraulic circuit 44 is shown in greater detail in FIG. 5. The valve 54 may be a spool valve 78 that has a closed position 80 which blocks the flow of hydraulic fluid through the circuit 44, a first position 82 which allows the hydraulic fluid to flow through the circuit 44 in the first direction 70, and a second position 84 which allows the hydraulic fluid to flow through the circuit 44 in the second direction 72. As such, the open position of the spool valve 78 includes the first position 82 and the second position 84. When the implement controller 58 is in the default position 64 (and the winch assembly 22 is inactive), the spool valve 78 may be in the closed position 80 to prevent or block the flow of the hydraulic fluid through the hydraulic circuit 44. When the implement controller 58 is displaced in the first direction 66 or the second direction 68, the control module(s) 60 may open the spool valve 78 by shifting the spool valve 78 to the first position 82 or the second position 84, respectively. In alternative designs, other types of valves may be used to regulate the flow of the hydraulic fluid through the hydraulic circuit 44.

Figure 6:
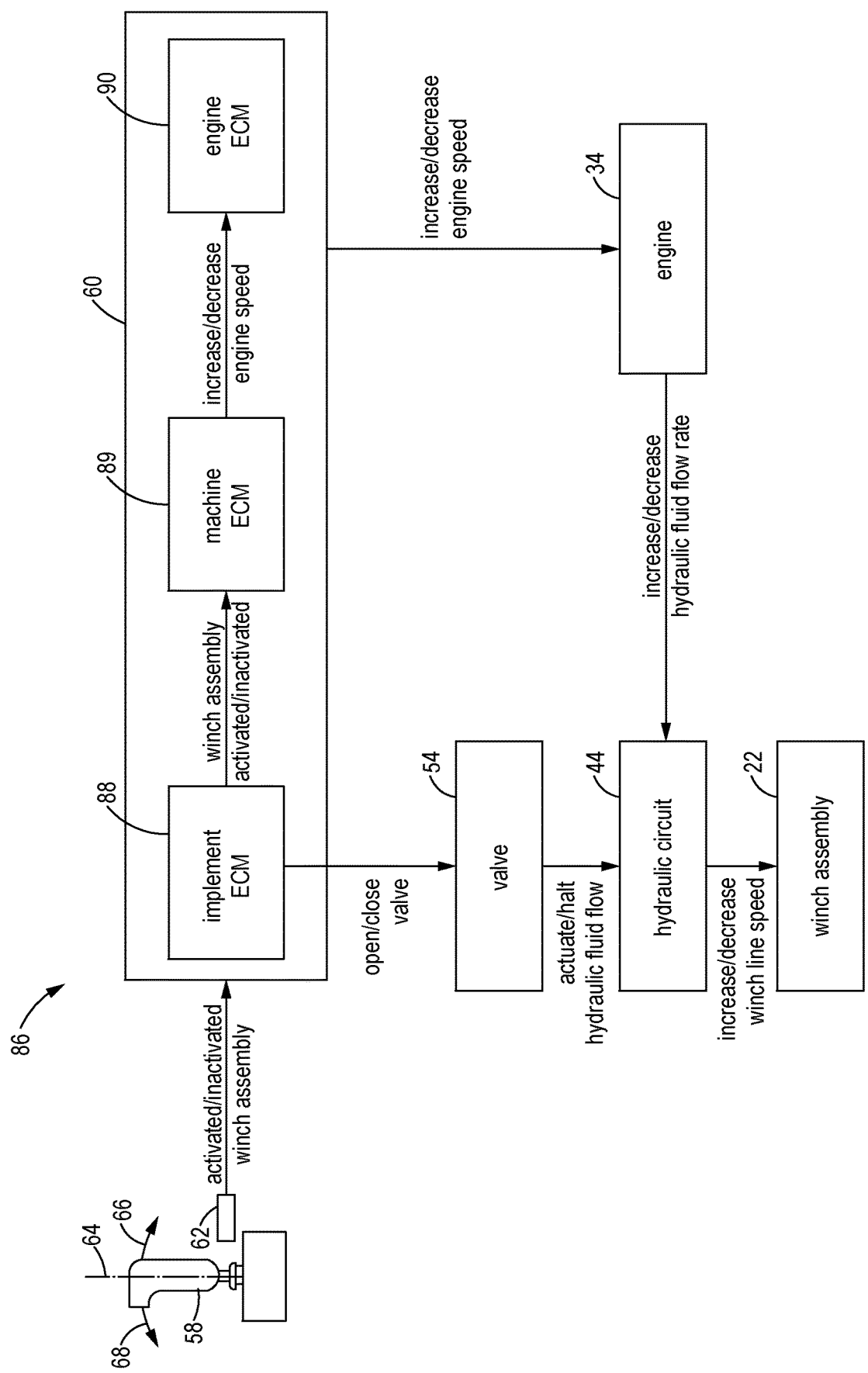
FIG. 6 is a schematic representation of a control system that controls the winch line speed of the winch assembly, in accordance with the present disclosure.

Turning now to FIG. 6, a schematic representation of a control system 86 for controlling the winch line speeds of the winch assembly 22 is shown. The control system 86 may include an implement electronic control module (ECM) 88, a machine electronic control module (ECM) 89, and an engine electronic control module (ECM) 90. The implement ECM 88 may be in electronic communication with the position sensor 62 of the implement controller 58, the valve 54, and the machine ECM 89, and the machine ECM 89 may be in electrical communication with the engine ECM 90. The engine ECM 90 may be in electrical communication with the engine 34.

The implement ECM 88 may receive a signal from the position sensor 62 indicating that the winch assembly 22 is activated upon displacement of the implement controller 58 in the first direction 66 or the second direction 68. The implement ECM 88 may also receive a signal from the position sensor 62 indicating that the winch assembly 22 is inactivated when the implement controller 58 reverts back to the default position 64 from a displaced position. Depending on the signals received from the position sensor 62, the implement ECM 88 may transmit a signal to the machine ECM 89 indicating that the winch assembly 22 is activated or inactivated. Moreover, in response to the signals received from the position sensor 62, the implement ECM 88 may transmit a command to open or close the valve 54, and the opening or closing of the valve 54 may actuate or halt the flow of the hydraulic fluid through the hydraulic circuit 44. In addition, in response to the signals received from the implement ECM 88, the machine ECM 89 may send commands to the engine ECM 90 requesting an increase in the engine speed (when the winch assembly 22 is activated) or a decrease in the engine speed (when the winch assembly 22 is inactivated). In response to the command from the machine ECM 89, the engine ECM 90 may send a command to the engine 34 to provide the requested increase or decrease in the engine speed. If an increase in the engine speed is requested, the engine speed may be increased from the lower first speed to the higher second speed by providing an appropriate increase in the flow rate of air and fuel to the engine 34. Likewise, if a decrease in the engine speed is requested, the engine speed may be decreased from the higher second speed to the lower first speed by providing an appropriate decrease in the flow rate of air or fuel to the engine 34. The increase or decrease in the engine speed may provide a corresponding increase or decrease in the flow rate of the hydraulic fluid through the hydraulic circuit 44, as well as a corresponding increase or decrease in the winch line speed of the winch assembly 22.

INDUSTRIAL APPLICABILITY

In general, the teachings of the present disclosure may find applicability in many industries including, but not limited to, construction, agriculture, and transportation industries. More specifically, the teachings of the present disclosure may be applicable to any industry using track-type machines having a winch assembly and an electric drive powertrain.

Figure 7:
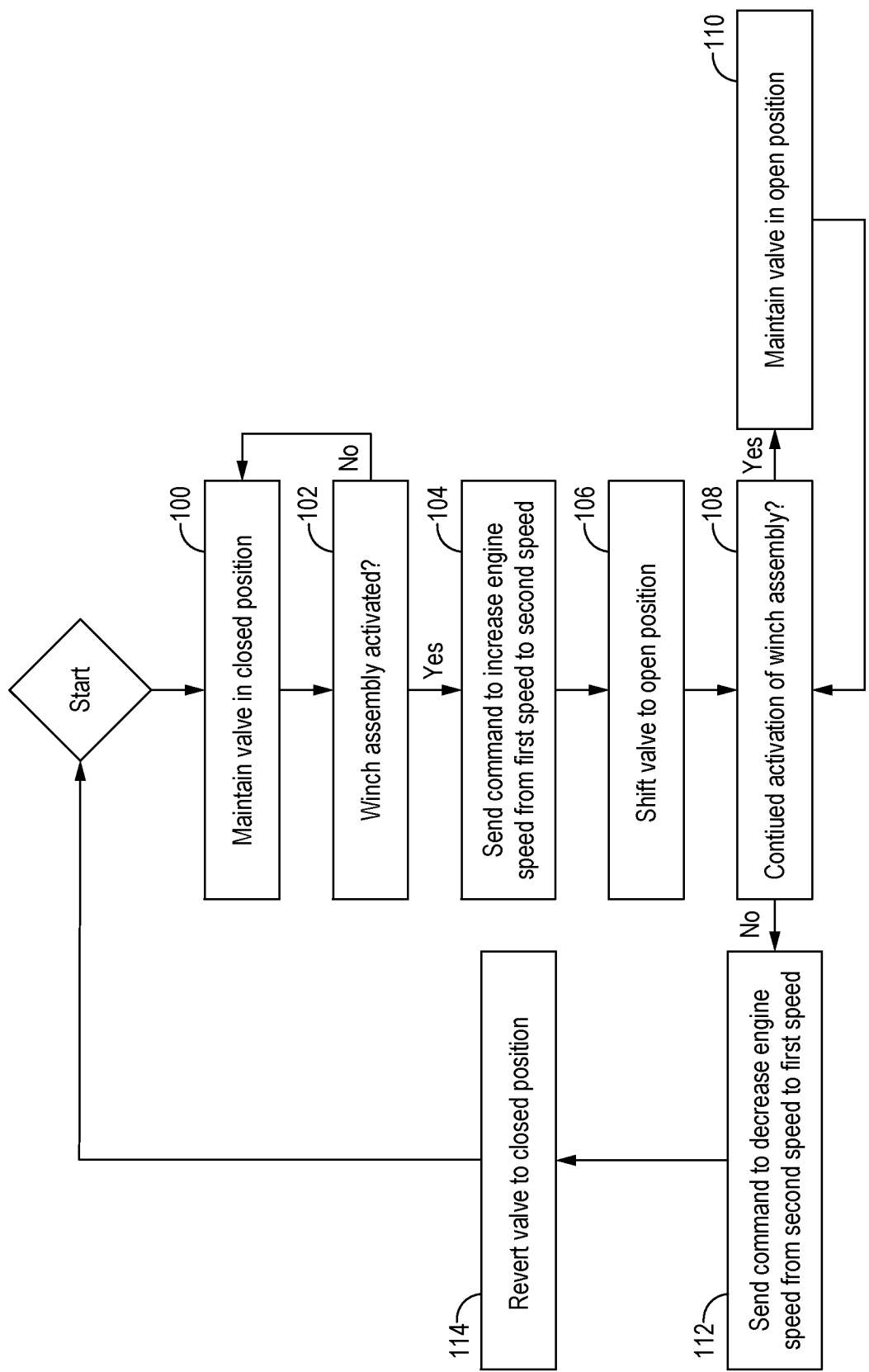
FIG. 7 is a flowchart of a series of steps that may be involved in controlling the winch assembly as implemented by an implement electronic control module (ECM) and a machine electronic control module (ECM) of the control system, in accordance with a method of the present disclosure.

FIG. 7 shows a method that may be involved in controlling the winch line speed of the winch assembly 22 as implemented by the implement ECM 88 and the machine ECM 89. At a first block 100, the implement ECM 88 may maintain the valve 54 in the closed position 80 when the winch assembly 22 is inactive (i.e., when the implement controller 58 is in the default position 64). At a next block 102, the implement ECM 88 may determine if the winch assembly 22 is activated based on signals received from the implement controller 58. If the winch assembly 22 remains inactive (i.e., the implement controller 58 remains in the default position 64), the implement ECM 88 may continue to maintain the valve 54 in the closed position 80 (block 100). If the winch assembly 22 is activated by displacement of the implement controller 58 in the first direction 66 or the second direction 68, the implement ECM 88 may respond by informing the machine ECM 89 that the winch assembly is activated, and the machine ECM 89 may transmit a command to the engine ECM 90 to increase the engine speed from the lower first speed to the higher second speed (block 104). Furthermore, the implement ECM 88 may respond to the signal indicating that the winch assembly 22 is active by shifting the valve 54 to the open position (e.g., the first position 82 or the second position 84 depending on the direction of displacement of the implement controller 58) (block 106). It will be understood that the blocks 104 and 106 may be carried out in different orders, or simultaneously.

At a next block 108, the implement ECM 88 may continue to monitor the active or inactive state of the winch assembly 22 based on signals received from the implement controller 58. If the winch assembly 22 remains active (i.e., the implement controller 58 is displaced from the default position 64), the implement ECM 88 may maintain the valve 54 in the open position (block 110). If the winch assembly 22 is inactivated (i.e., the implement controller 58 reverts to the default position 64), the implement ECM 88 may inform the machine ECM 90 that the winch assembly is inactivated, and the machine ECM 90 may respond by sending a command to the engine ECM 90 to decrease the engine speed from the higher second speed to the lower first speed (block 112). In addition, the implement ECM 88 may revert the valve 54 to the closed position 80 to stop the flow of hydraulic fluid through the hydraulic circuit 44 and the rotation of the drum 24 (block 114). It will be understood, however, that the blocks 112 and 114 may be carried out in different orders or simultaneously. Furthermore, it will be understood that the functions of the implement ECM 88 and the machine ECM 90 as disclosed herein may be carried out by a single electronic control module, or more than two electronic control modules. The method of FIG. 7 may be continuously repeated during the operation of the machine 10, as shown.

Figure 8:
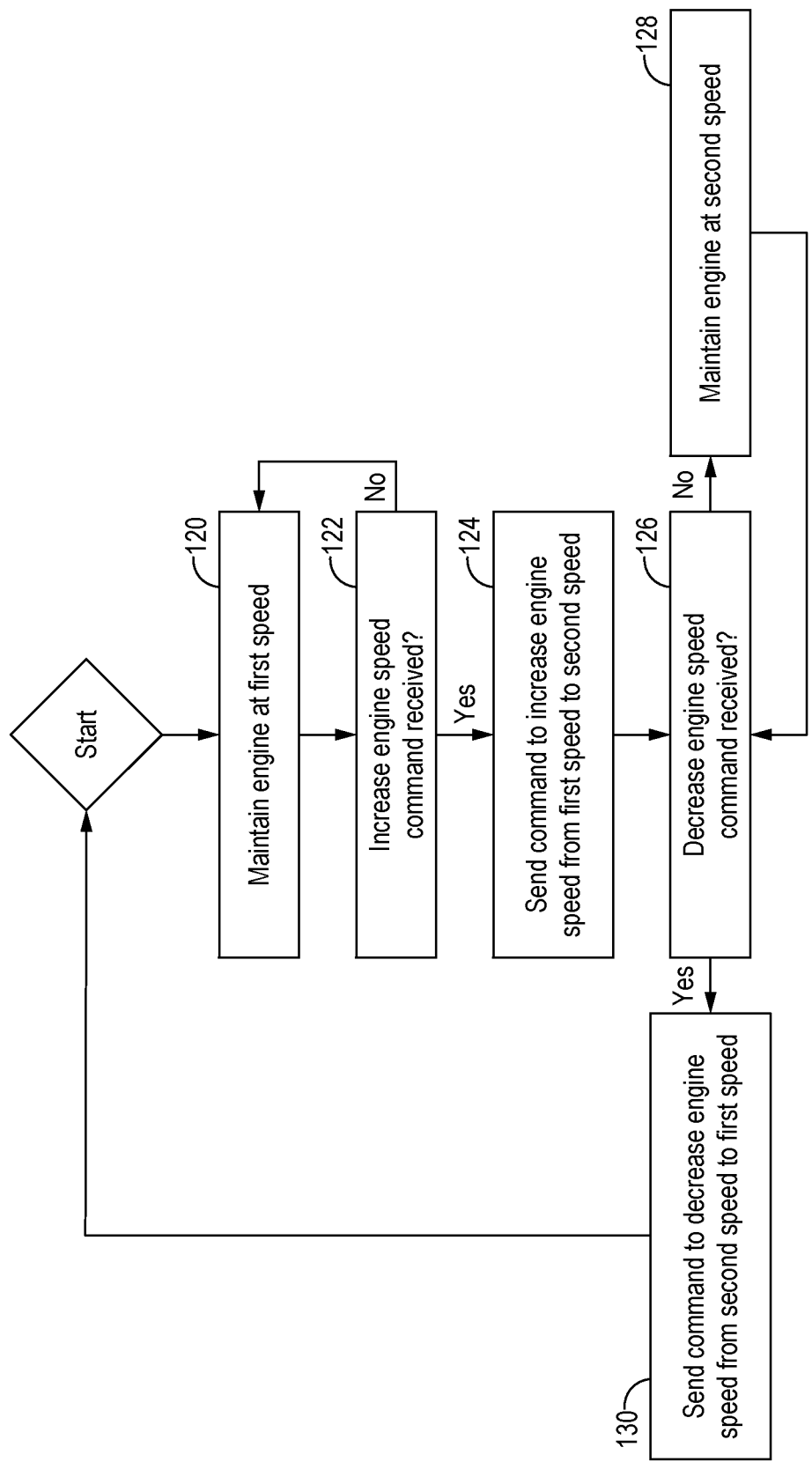
FIG. 8 is a flowchart of a series of steps that may be involved in controlling the engine speed of the track-type machine as implemented by the engine ECM, in accordance with a method of the present disclosure.

FIG. 8 shows a method that may be involved in controlling the engine speed based on the active or inactive state of the winch assembly 22, as implemented by the engine ECM 90. At a first block 120, the engine speed may be maintained at the lower first speed when the winch assembly 22 is inactive. According to a block 122, the engine ECM 90 may await a command to increase the engine speed from the machine ECM 89. If such a command is not received, the engine ECM 90 may maintain the engine speed at the lower first speed. If, however, the engine ECM 90 does receive a command to increase the engine speed from the machine ECM 89, the engine ECM 90 may respond by sending a command to the engine 34 to increase the engine speed from the lower first speed to the higher second speed, to thereby provide a corresponding increase in the winch line speed (block 124). After increasing the engine speed, the engine ECM 90 may await a command from the machine ECM 89 to decrease the engine speed (when the winch assembly 22 is inactivated) (block 126). If such a command is not received from the machine ECM 89 due to continued activity of the winch assembly 22, the engine ECM 90 may maintain the engine 34 at the higher second speed (block 128). If the command to decrease the engine speed is received from the machine ECM 89 due to inactivation of the winch assembly 22, the engine ECM 90 may respond by sending a command to the engine 34 to decrease the engine speed from the second speed to the first speed. The method of FIG. 8 may be continually repeated during the operation of the machine 10, as shown.

The present disclosure provides a control system for controlling winch line speeds in track-type machines having an electric drive powertrain. Specifically, the control system temporarily increases the engine speed when the winch assembly is active to allow the winch line speed to reach targeted speeds, and operates the engine at a lower speed when the winch assembly is inactive. Accordingly, the track-type machine may operate at a low speed (eco-mode) during normal operation (i.e., when the winch assembly is inactive) to provide a desirable balance between fuel efficiency and emissions. The engine speed is only increased as needed during winch assembly operation to provide higher winch line speeds and enhanced performance and controllability of the winch assembly. This is an improvement over prior art systems in which the winch line speeds are limited and cannot reach higher targeted speeds due to the low operating speed of the engine. It is expected that the technology disclosed herein may find wide industrial applicability in a wide range of areas such as, but not limited to, construction, agriculture, mining, automotive, and power generation applications.

What is claimed is:

1. A track-type machine, comprising:
   tracks;
   an electric drive powertrain configured to drive the tracks for rotation and including an internal combustion engine, an electric generator, and an electric motor, the internal combustion engine being configured to operate at an engine speed;
   a winch assembly including a drum rotatably supporting a cable so that the cable is reeled in or reeled out at a winch line speed when the drum is rotating;
   an implement controller configured to activate the winch assembly for reeling in or reeling out the cable;
   a hydraulic circuit configured to actuate a rotation of the drum when the winch assembly is activated by the implement controller, a flow of hydraulic fluid through the hydraulic circuit being driven by the internal combustion engine such that a flow rate of the hydraulic fluid through the hydraulic circuit increases as the engine speed increases, a rate of rotation of the drum and the winch line speed increasing as the flow rate of the hydraulic fluid through the hydraulic circuit increases; and
   a control system configured to increase the engine speed of the internal combustion engine when the winch assembly is activated by the implement controller.

2. The track-type machine of claim 1, wherein the control system is further configured to decrease the engine speed when the winch assembly is inactivated by the implement controller.

3. The track-type machine of claim 2, wherein the winch line speed is about 20% higher when the engine speed is increased by the control system.

4. The track-type machine of claim 2, wherein the control system includes an implement electronic control module (ECM), a machine electronic control module (ECM), and an engine electronic control module (ECM), and wherein the implement ECM is configured to receive a signal from the implement controller when the winch assembly is activated by the implement controller, and to transmit a signal to the machine ECM indicating that the winch assembly is activated.

5. The track-type machine of claim 4, wherein the machine ECM is configured to respond to the signal from the implement ECM indicating that the winch assembly is activated by transmitting a command to the engine ECM to increase the engine speed, and wherein the engine ECM is configured to respond to the command from the machine ECM by increasing a flow rate of air and fuel to the internal combustion engine to thereby increase the engine speed.

6. The track-type machine of claim 5, wherein the implement ECM is further configured to receive a signal from the implement controller when the winch assembly is inactivated by the implement controller, and to transmit a signal to the machine ECM indicating that the winch assembly is inactivated.

7. The track-type machine of claim 6, wherein the machine ECM is configured to respond to the signal from the implement ECM indicating that the winch assembly is inactivated by transmitting a command to the engine ECM to decrease the engine speed, and wherein the engine ECM is configured to respond to the command to decrease the engine speed by decreasing a flow rate of air or fuel to the internal combustion engine to thereby decrease the engine speed.

8. The track-type machine of claim 7, wherein the hydraulic circuit includes a hydraulic pump driven by the internal combustion engine, and a hydraulic motor driven by the hydraulic pump, and wherein the drum is rotatably coupled to a shaft that is driven by the hydraulic motor.

9. The track-type machine of claim 8, wherein:
the hydraulic circuit further includes a valve associated with the hydraulic pump that opens and closes to control the flow of hydraulic fluid through the hydraulic circuit; and
the implement ECM is further configured to open the valve upon receipt of the signal indicating that the winch assembly is activated, the opening of the valve permitting the flow of hydraulic fluid through the hydraulic circuit.

10. A control system for controlling a winch line speed of a winch assembly of a track-type machine, the track-type machine including an electric drive powertrain having an engine operating at an engine speed, an implement controller configured to activate the winch assembly for reeling in and reeling out a cable of the winch assembly at the winch line speed, and a hydraulic circuit driven by the engine and configured to actuate the winch assembly when, a hydraulic fluid flows therethrough, the control system comprising:
an implement electronic control module (ECM) configured to receive a signal indicating that the winch assembly is activated when the winch assembly is activated by the implement controller;
a machine electronic control module (ECM) configured to receive a signal from the implement ECM indicating that the winch assembly is activated, and to respond to the signal by transmitting a command to increase the engine speed; and
an engine electronic control module (ECM) configured to receive the command to increase the engine speed from the machine ECM, and to respond to the command by increasing the engine speed, the increase in the engine speed providing an increase in a flow rate of the hydraulic fluid through the hydraulic circuit and an increase in the winch line speed.

11. The control system of claim 10, wherein the implement ECM is further configured to receive a signal indicating that the winch assembly is inactivated when the winch assembly is inactivated by the implement controller, and wherein the machine ECM is configured to receive a signal from the implement ECM indicating that the winch assembly is inactivated.

12. The control system of claim 10, wherein the hydraulic circuit includes a valve that opens and closes to control a flow of the hydraulic fluid through the hydraulic circuit, and wherein the implement ECM is further configured to shift the valve to an open position upon receipt of the signal indicating that the winch assembly is activated, the open position of the valve permitting the flow of the hydraulic fluid through the circuit.

13. The control system of claim 12, wherein the valve is a spool valve having at least a first position allowing the hydraulic fluid to flow through the hydraulic circuit in a first direction for reeling in the cable, and a second position allowing the hydraulic fluid to flow through the hydraulic circuit in a second direction for reeling out the cable, and wherein the implement ECM is configured to shift the valve to the first position when the implement controller is displaced in a first direction, and to shift the valve to the second position when the implement controller is displaced in a second direction.

14. The control system of claim 10, wherein the engine ECM increases the engine speed by increasing a flow rate of air or fuel to the engine.

15. The control system of claim 10, wherein the increase in the engine speed by the engine ECM increases the winch line speed by about 20%.

16. A method for controlling a winch line speed of a winch assembly of a track-type machine, the winch assembly including a drum rotatably supporting a cable, the track-type machine having an electric drive powertrain including an internal combustion engine configured to operate at an engine speed, the method comprising:
receiving a signal indicating that the winch assembly is activated;
increasing the engine speed in response to receipt of the signal indicating that the winch assembly is activated; and
actuating a flow of hydraulic fluid through a hydraulic circuit in response to receipt of the signal that the winch assembly is activated, the flow of the hydraulic fluid through the hydraulic circuit being driven by the internal combustion engine and driving a rotation of the drum to reel in or reel out the cable at the winch line speed, a flow rate of the hydraulic fluid through the hydraulic circuit and the winch line speed increasing as the engine speed is increased.

17. The method of claim 16, further comprising receiving a signal, indicating that the winch assembly is inactivated, and decreasing the engine speed in response to receipt of the signal indicating that the winch assembly is inactivated.

18. The method of claim 16, wherein receiving the signal indicating that the winch assembly is activated comprises receiving a signal from a position sensor associated with an implement controller when a user displaces the implement controller from a default position.

19. The method of claim 16, wherein increasing the engine speed increases the winch line speed by about 20%.

20. The method of claim 16, wherein actuating the flow of the hydraulic fluid through the hydraulic circuit comprises actuating a valve to an open position, the open position of the valve permitting the flow of the hydraulic fluid through the hydraulic circuit.

* * * * *